United States Patent [19]

Wolkewitz et al.

[11] Patent Number: 4,820,172

[45] Date of Patent: Apr. 11, 1989

[54] COMPOSITE ELECTRICAL CONNECTOR FOR APPARATUS INSTALLED IN A VEHICLE

[75] Inventors: Klaus Wolkewitz; Alfons Scheck, both of Hildesheim; Kurt Seeberger, Bad Salzdetfurth, all of Fed. Rep. of Germany

[73] Assignee: Blaupunkt-Werke GmbH, Hildesheim, Fed. Rep. of Germany

[21] Appl. No.: 144,807

[22] Filed: Jan. 15, 1988

[30] Foreign Application Priority Data

Jan. 19, 1987 [DE] Fed. Rep. of Germany ....... 3701373

[51] Int. Cl.[4] .............................................. H01R 9/09
[52] U.S. Cl. ..................................... 439/76; 439/304; 439/554
[58] Field of Search ..................................... 439/74–76, 439/78, 304, 547, 554

[56] References Cited

U.S. PATENT DOCUMENTS

| | | | |
|---|---|---|---|
| 3,996,500 | 12/1976 | Caules | 439/554 |
| 4,355,853 | 10/1982 | Kourimsky | 439/76 |
| 4,555,156 | 11/1985 | Kourimsky | 439/304 |
| 4,669,793 | 6/1987 | Hayashi et al. | 439/64 |
| 4,737,888 | 4/1988 | Bodnar et al. | 439/78 |

Primary Examiner—P. Austin Bradley
Attorney, Agent, or Firm—Frishauf, Holtz, Goodman & Woodward

[57] ABSTRACT

In order to reduce the variety of connector bodies needed for connecting electrical apparatus such as an automobile radio to factory-installed cabling of a motor vehicle having a mating connector for connection to the electrical apparatus, a composite connector is provided having a front unit with two sets of contacts respectively interconnected by a circuit board, of which the first set is designed to interfit with the mating connector of the vehicle and the second set is designed to interfit with the contacts of a second unit of the composite connector. That second unit has a set of contacts connected to a circuit board which carries circuit components for protection of electrical circuits from external interference. A flat parallel conductor cable is introduced through a slot in the second unit for connection to its circuit board before the circuit board is put in place. A spacing frame separate from the second unit is interposed between the circuit board side of the second unit and the surface of the apparatus casing on which the connector is mounted and to which the second unit can be held by a screw. Spring clasps are provided to hold the units to each other and to the apparatus on which the composite connector is mounted.

21 Claims, 4 Drawing Sheets

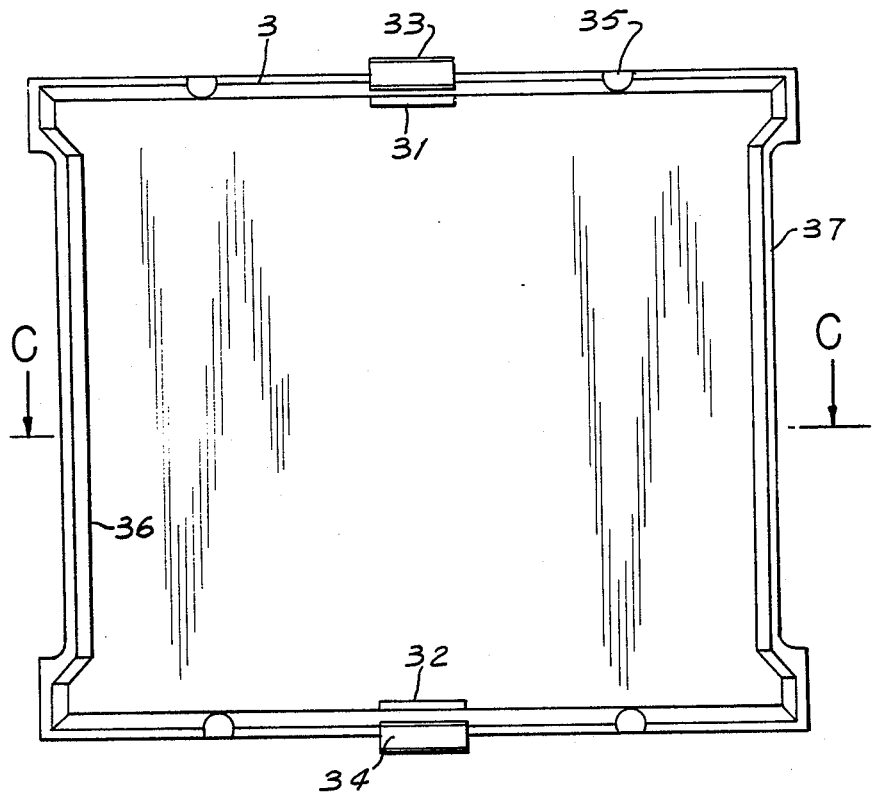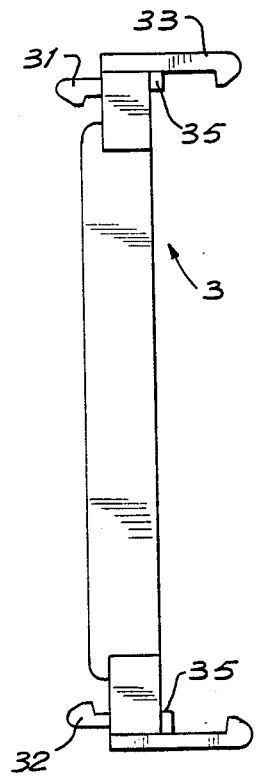
FIG. 4a
FIG. 4b
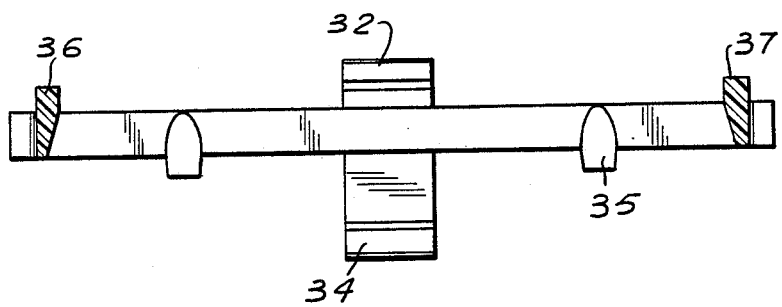
FIG. 4c

COMPOSITE ELECTRICAL CONNECTOR FOR APPARATUS INSTALLED IN A VEHICLE

This invention concerns a composite electrical connector to be wired to an electrical apparatus such as the radio of a motor vehicle, and preferably to be mounted on the structure or casing of the apparatus, for making connection to a mating connector provided on cabling installed in the vehicle. In particular the invention concerns a composite electrical connector which with very slight changes not involving its physical structure can be utilized for connecting virtually any model of automobile radio into the cabling of virtually any make or model of automobile.

The installation of radios in modern road vehicles requires connection not only to the electrical current supply and to one or more loud speakers, but sometimes also to remote control devices which may contain a digital display as well as selector buttons and rotary controls of various kinds. Conductors and connector plugs may be necessary in some cases in considerable number. The provisions for making all these connections external to the radio need to be provided in a way which does not unduly complicate the installation of the radio.

The present practice of installing radios in automobiles leaves a great deal to be desired with respect to the ease of making the necessary connections. It is often difficult, moreover, to make connections to the originally installed cables for electrical power distribution, loud speaker connections and the like without expensive connector adaptation to the radio model or to the cabling of a particular model of vehicle.

SUMMARY OF THE INVENTION

It is an object of the present invention to provide a connector of great versatility for radio and related electrical equipment which will vary as little as possible with vehicle make or model or from one radio model or make to another. It is a further object of the invention to provide a composite connector such that changes necessary to adapt the connector to cabling of different makes of vehicles and to the various electrical inputs and outputs of different radio models can be provided inexpensively.

Briefly, the composite connector is made of detachable parts, a first one providing a connection interface for a mating connector of a cable installed in the vehicle and a second one for being wired to the inputs and outputs of the radio or of some other much-used electrical equipment installed in a vehicle.

Because an installed radio may be of a size and location such that the mechanical connection of the cabling of the car to the radio may not easily be made by plugging the cable connector into a chassis connector on the radio either directly or with an adaptor, the composite connector of the invention, although it is mountable directly on a casing or other structural surface of the radio, does not need to be mounted on the radio itself in all cases and may be connected with some appropriate length of flat multiconductor cable coming out from the radio, so as to provide a possibility for locating the composite connector at any reasonable distance from the radio in special cases.

More important, the unit that provides the interface with the cable connector of the vehicle includes a circuit board for interconnecting the contact members that make contact with the cable connector to another set of contact members for plugging into another unit which contains the wired connections to the radio. That other unit also contains components for protection of the circuits against electrical disturbances and these are carried on a circuit board in that unit.

Preferably the unit which provides the wired connections to the radio has a detachable spacing frame for surrounding the wired connections, in order to provide wiring space between its circuit board and the mounting surface for the connector.

The invention has the advantage that it becomes easy and economical to adapt a particular model of the particular electronic equipment with whatever cable connection is provided on the factory-installed wiring of any of a wide variety of vehicles. The invention is applicable not only to all kinds of radio receivers, but also to other electronic apparatus as for example cassette and compact disc players, recorders and radio transmitters. The flexibility of application of the basic connector structure of the invention is useful not only for the installation of original equipment, but also for subsequent retrofitting.

The invention makes possible a great reduction of the number of different types of connectors in manufacture and storage. One particular kind of cable connector in a vehicle needs to be connected with only one embodiment of the detachable unit of the connector, while the number of different second units for being wired to the electrical equipment depends only on the number of varieties of the electrical equipment and is not multiplied by the number of vehicle types.

BRIEF DESCRIPTION OF THE DRAWINGS

The invention is further described by way of illustrative example with reference to the annexed drawings, in which:

FIG. 2b is a view of the same unit shown in FIG. 2a from the electrical equipment side with the circuit board 14 of FIG. 2a omitted from the view, also showing by the line A—A the particular cross-section shown in FIG. 2a;

FIG. 4a is a front view, FIG. 4b is a side view and FIG. 4c is a top view of a median cross-section of the spacing frame of the rear unit of the composite connector.

DESCRIPTION OF THE ILLUSTRATED EMBODIMENT

Figure 1:
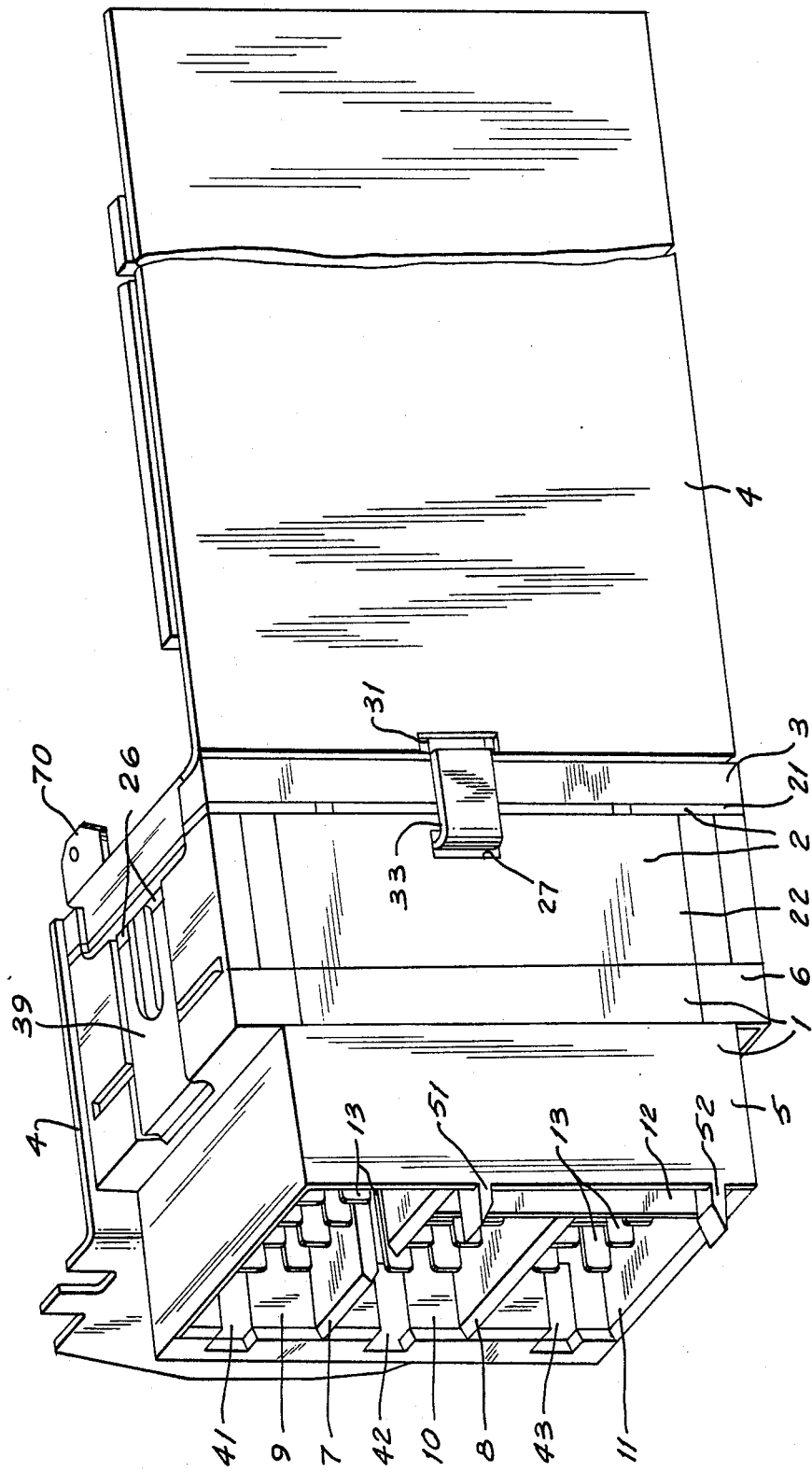
FIG. 1 is a perspective view of an illustrative embodiment in the invention.

The composite connector of the invention is shown fully assembled and mounted in FIG. 1. It consists of a first (detachable) contact and circuit unit 1, a second contact and circuit unit 2 and spacing frame 3. It is fastened at the side of an automobile radio casing. The casing side wall 4 is all that is shown of the automobile radio in the drawings. The casing side wall 4 is so shaped that a nook provided at one of the rear corners of the radio receiver, so that the connector of the invention lies essentially within the rectangular contour of the auto radio but still outside the casing of the radio.

The first contact and circuit unit 1 has a one-piece molded plastic part consisting of a base plate 6 and a frame 5. Partition strips 7, 8 subdivide the interior of the frame 5 into various chambers 9, 10, 11 and 12 open at the front and each enclosing the forward ends of flat strip contacts such as the contacts 13, which are held by being preferably molded into the base plate 6.

In the illustrated example the contacts of the chamber 9 are for the operating voltage, for control of a motorized antenna and for connection of the tuning scale or digital display illumination of the auto radio to the adjustable operating voltage which is provided for the dashboard illumination.

In the chamber 10 are the contacts for four loud speakers, including their common chassis ground connection. Keyway grooves 41, 42, and 43 are respectively provided in chambers 9, 10 and 11 for protection against mistaken false insertion of the mating connector plug (not shown) which is a part of the cabling installation of the vehicle. Finally, the chamber 12 is provided for connection-securing means described below.

Figure 2A:
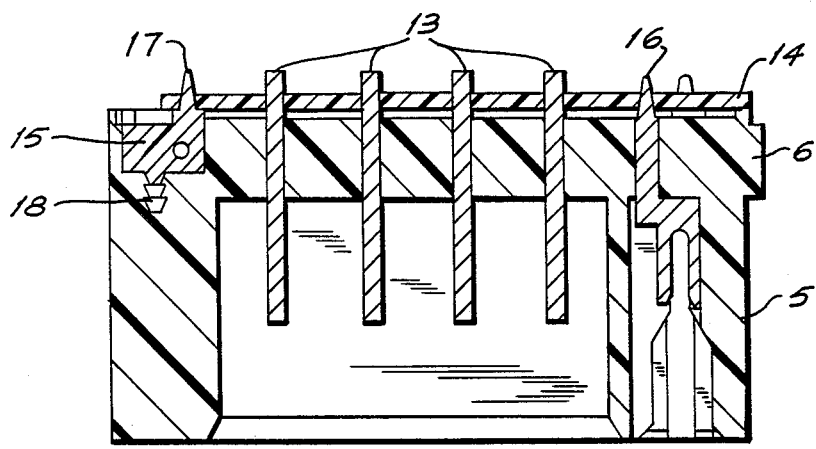
FIG. 2a is a cross-section of a detachable unit of the connector for matinq with the connector of a vehicle cable.
Figure 2B:
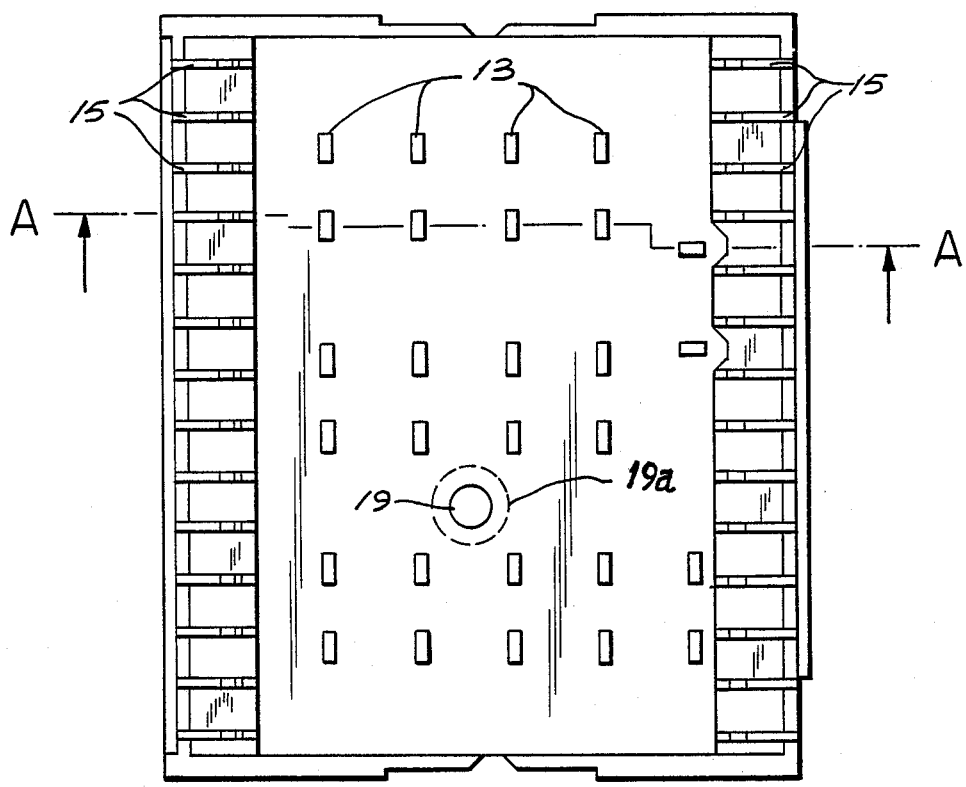

For further details of the first contact and circuit unit reference will now be made to FIGS. 2a and 2b. FIG. 2a is a cross-section along the line A—A designated in FIG. 2b. FIG. 2b is a view of the first contact and circuit unit seen from the side facing the auto radio equipment, but with the circuit board 14 of in FIG. 2a removed or not yet put into place. The circuit board 14 is shown only in FIG. 2a. It connects the flat-strip contacts 13 with the blade contacts 15 set in rows just inside opposite edges of the base plate 6.

Whereas flat contact strips 13 are used for the contacts that serve for connection of the automobile radio with the cabling that is installed within the vehicle, at least one grasping contact spring 16 capable of providing a snap connections to a corresponding plug extending from the mating connector (not shown) of the vehicle cabling is provided for assuring a mechanical connection that will not shake loose. The illustrated clasp spring 16 is located, as already mentioned, in the cavity 12 shown in FIG. 1. It may be mentioned at this point that projections 51 and 52 shown in FIG. 1 are provided at one side of the cavity 12 for insertion in a guiding keyway of the mating connector (not shown) of the vehicle cabling.

The blade contacts 15 each have a solder lug portion 17 projecting through the circuit board 14 and have a sawtooth tongue 18 anchored in the injection molded plastic body which comprises the base plate 6 and the frame 5. A bore 19 is provided both in the base plate 6 and in the circuit board 14 for passage of a fastening screw, not shown in the drawing, by which the first contact and circuit unit now being described can be fastened to an internally threaded cylindrical column indicated as by the broken circle 19a in FIG. 2b, actually mounted on the interior of the sidewall 4 of the automobile radio in a manner not shown in the drawings.

The kind and number of the contacts in the first contact and circuit unit, as well as the subdivision of the unit into individuals chambers, is to be designed and manufactured so as to fit the particular vehicle in which the auto radio or other electrical equipment needs to be installed. Consequently, instead of the flat strip contacts 13, round rods or tubes could be used for contacts.

The blade contacts 15, on the other hand, are provided for the various voltages and signals in a manner that does not vary according the different vehicles into which a radio is to be installed. These voltages and signals going to or coming from the radio to be installed are supplied or taken from the second contact and circuit unit 2, shown assembled with the first unit in FIG. 1. This second unit, in addition to carrying contacts and connections thereto also contains components that are, essentially, means for providing some protection of electrical circuits against extraneous disturbances, such as automobile engine ignition noise, for example.

The details of the second contact and circuit unit 2, which has its own circuit board 21, are described with reference to FIGS. 3a, 3b and 3c. A single set of contacts 23, each going from front to back of the unit, are mounted in this case on an open frame 22, in two opposite sides of the frame in which they are embedded. The contacts 23 are contact springs having bifurcated ends for making spring contact in each case with one of the blade contacts 15 of the first contact and circuit unit. At the other ends the spring contacts 23 have solder lug portions 24 which pass through holes in the circuit board 21 located at the rear of the frame 22 and are soldered to contact areas of the circuit paths thereof.

On the two sides of the frame 22 which are not occupied internally by the contact springs 23 there are respective elongated cut-outs 25 facing the circuit board edges, through which flat flexible cables having parallel strip conductors (not shown—these being of a well known kind) can pass so as to make connections between the circuit board and the radio receiver from which the flat cables are brought out. Their conductors can conveniently be soldered to the circuit board before the circuit board is pushed against the frame to allow the solder lugs 24 of the contacts 23 to pass through the corresponding holes, after which the solder lugs are soldered to the board (which may be sufficient to hold the board in place). Apertures 26 of the frame 22 are provided for latching of two bent-over end tabs of a spring clip 39 as illustrated in FIG. 1.

The space inside of the frame 22 allows for the provision of circuit components 55, 56 (installed on the circuit board 21 before it is put in place) for the disturbance-reducing circuits previously mentioned and of course the height or front-to-back dimension of the frame 22 must be sufficient for accommodating these components.

A spacing frame, shown at 3 in FIG. 1, and illustrated in FIGS. 4a and 4b and 4c, is provided to assure room for the soldered connections to the solder lugs 24 of the spring contacts 23 to the circuit board 21 and likewise for the connections of the conductors of the flat cables to the circuit board. The spacing frame 3, like the frame 22 of the second contact and circuit unit 2, is an injection molded part. A preferred material for the body 5, 6 of the unit 1 is a material available commercially under the designation "Makrolon" PC 8025-1. This being the case, the same material is also preferably used for the frames 3 and 22.

Figure 3A:
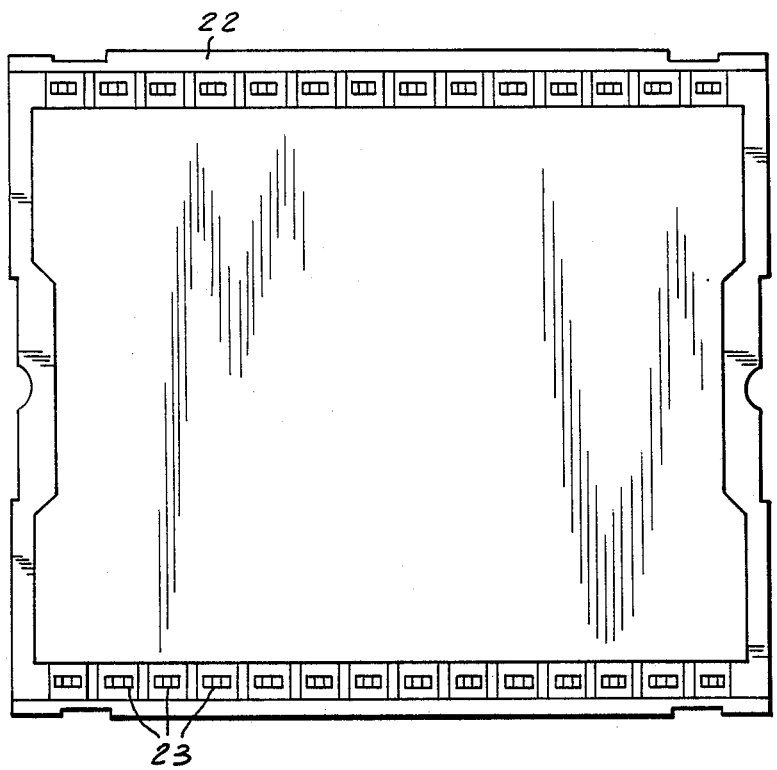
FIGS. 3a is a front view.
Figure 3B:
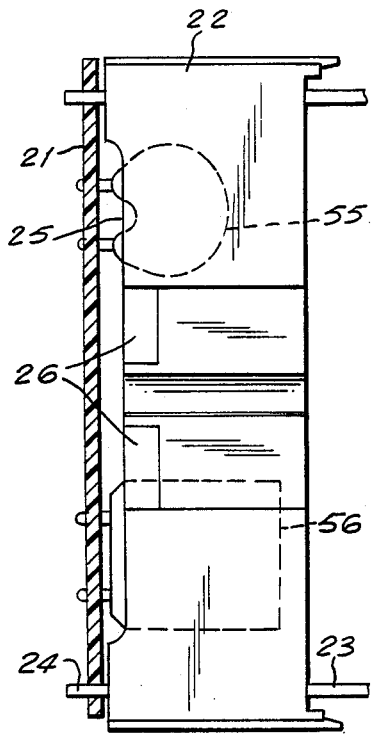
FIG. 3b is a side view and FIG. 3c is a top view of the rear unit of the composite connector, with its spacing frame detached therefrom.
Figure 3C:
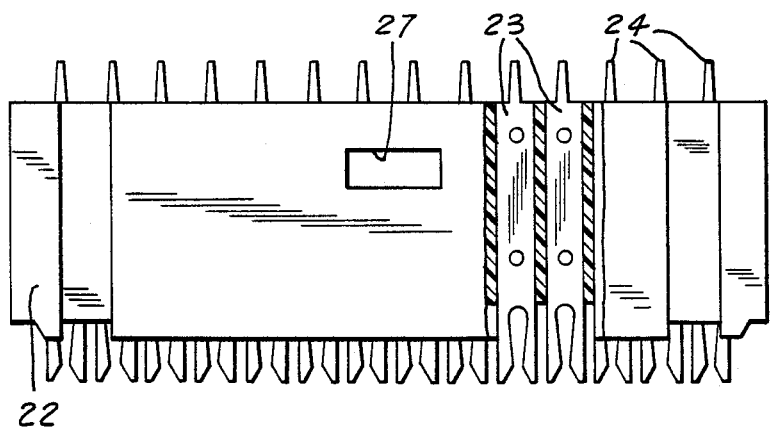

FIG. 3a is a view from the front of the frame 3 which fits against the circuit board 21 which, in turn, is seated on the frame 22 of the second unit 2. FIG. 4b is a side view from one of the narrow sides of the frame 3 and FIG. 4 is a cross-section along the line C—C of FIG. 4a.

Spring clips 31 and 32 are provided on opposite inner sides of the frame 3 for snap fastening the frame 3 (FIG. 4a) to the side wall 4 (FIG. 1) of the auto radio. On opposite outer sides of the frame 3 spring clips 33 and 34 are provided extending in the other direction for snap fastening the frame 3 to the remainder of the second contact and circuit unit 2 of the composite connector, this being done by the spring clips catching into apertures in the frame 22 of the second unit, one of which apertures is shown at 27 in FIG. 1 and FIG. 3c. These spring clips hold the composite connector together as it is assembled and also in while it is in use. The connector is fastened in place by the use of the screw fastening already described in connection with the bore 19 shown in FIG. 2b.

For positioning the circuit board 21 with respect to the spacing frame 3 there are provided four studs 35 fitting into corresponding cut-outs of the circuit board 21. The spacing frame 3 is inwardly offset at 36 and 37 at opposite sides, in order to provide space for the flat conductor cables or conductors which may be required to pass through the cutouts 25 (FIG. 3b) of the second contact and circuit unit 2 for completing connections between the circuit board 21 and the inside of the automobile radio. The detachable first contact and circuit unit 1 which is particularly illustrated in FIG. 2a and FIG. 2b is fastened to the frame 22 of the second unit 2, as already mentioned, by two spring clips 39, only one of which is visible in FIG. 1. An additional mounting clip or guide is shown at 70 in FIG. 1. Again, two such optional guides could be used for opposite sides of the connector.

Although the invention has been described with reference to a particular illustrative embodiment, it will be understood that variations and modifications are possible within the inventive concept.

We claim:

1. Composite electrical connector for connecting an electrical apparatus installed in a vehicle to cabling mounted in said vehicle and having a mating connector, comprising:
   a first contact and circuit unit (1) detachable from and attachable to the remainder of the composite connector, having a first set of contact members (13) mounted in a manner for fitting a first side of said first unit to a said mating connector of cabling of a vehicle for electrical connection of said first set of contact members thereto and having a second set of contact members (15) and also a first circuit board (14) interconnecting at least some contact members (13) of said first set respectively with at least some contact members (15) of said second set;
   a second contact and circuit unit (2) having a set of contact members (23) for respectively engaging contact members (15) of said second set of said first contact and circuit unit (1) when the first unit is attached to said second contact and circuit unit, said second contact and circuit unit (1) also having a second circuit board (21) connected to said contact members (23) of said second contact and circuit unit and carrying components for protection of circuits from electrical disturbance and providing connection to said components and also carrying means for allowing permanent electrical connections to be made between said second circuit board (21) and connection conductors serving an electrical apparatus installed in said vehicle;
   said second set of contacts (15) of said first contact and circuit unit (1) being disposed for making contact with said set of contact members (23) of said second contact and circuit unit (2) when a side of said first contact and circuit unit other than said first side thereof is fitted against a first side of said second contact and circuit unit for connection of said first to said second unit, and
   means for securing said first and second contact circuit units to a structural surface of said electrical apparatus in a manner in which a side of said second contact and circuit unit other than said first side thereof is put against at least a part of said structural surface.

2. Composite connector as defined in claim 1, wherein said second contact and circuit unit (2) comprises, in addition to said contact members (23) of said second contact and circuit unit, said second circuit board (21) and components and connection means carried on said circuit board, a first frame (22) for holding said contact members (23) in such a manner that the contact portions and solder lug (24) portions thereof project from said frame, said contact portions in each case including spring prongs.

3. Composite connector as defined in claim 2, wherein said second circuit board (21) is substantially rectangular and the length of its sides, the length of the corresponding sides of said first frame (22) of said second unit and the length of the corresponding sides of said base plate (6) of said first unit are substantially the same.

4. Composite connector as defined in claim 3, wherein spring clasps (39) are provided for holding together said base plate (6) of said first unit and said first frame (22) of said second unit at least two opposite sides of said base plate and of said first frame.

5. Composite connector as defined in claim 3, wherein said second contact and circuit unit (2) also comprises a spacing frame (3) detachable from and attachable to the remainder of said second contact and circuit unit and having the same side lengths as said first frame (22) of said second circuit unit for being interposed between said second circuit board (21) and said electrical apparatus.

6. Composite connector as defined in claim 5, wherein resilient catches (31, 32) are provided for holding said spacing frame (3) against said surface of said electrical apparatus.

7. Composite connector as defined in claim 5, wherein resilient catches (33, 34) are provided for said spacing frame (3), each for catching in a cavity (27) provided in said first frame (22) of said second contact and circuit unit (2).

8. Composite connector as defined in claim 1 wherein said first contact and circuit unit (1) comprises a base plate (6) from which projects on said first side of said unit a frame (5) surrounding outer portions of said contact members of said first set, said contact members (13) of said first set being held in said base plate, said contact members (15) of said second set being provided in at least one row near an edge of said base plate (6) and disposed along said edge.

9. Composite connector as defined in claim 8, wherein said contact members (15) of said second set of said first contact and circuit unit (1) are disposed in two oppositely located rows in two regions respectively located near opposite edges of said base plate (6).

10. Composite connector as defined in claim 9, wherein said second contact and circuit unit comprises, in addition to said contact members of said second contact and circuit unit, said circuit board and components and connection means carried on said circuit board, a first frame for holding said contact members in such a manner that the contact portions and solder lug portions thereof project from said frame, said contact portions in each case including spring prongs.

11. Composite connector as defined in claim 10, wherein said second circuit board is substantially rectangular and the length of its sides, the length of the corresponding sides of said first frame of said second unit and the length of the corresponding sides of said base plate of said first unit are substantially the same.

12. Composite connector as defined in claim 11, wherein spring clasps (39) are provided for holding together said base plate (6) of said first unit and said first frame (22) of said second unit at at least two opposite sides of said base plate and of said first frame.

13. Composite connector as defined in claim 11, wherein said second contact and circuit unit also comprises a spacing frame (3) detachable from and attachable to the remainder of said second contact and circuit unit and having the same side lengths as said first frame of said second circuit unit, for being interposed between said second circuit board (21) and said electrical apparatus.

14. Composite connector as defined in claim 13, wherein resilient catches (31, 32) are provided for holding said spacing frame (3) against said surface of said electrical apparatus.

15. Composite connector as defined in claim 13, wherein resilient catches (33, 34) are provided for said spacing frame (3), each for catching in a cavity provided in said first frame of said second contact and circuit unit.

16. Composite connector as defined in claim 8, wherein said second contact and circuit unit comprises, in addition to said contact members of said second contact and circuit unit, said circuit board and components and connection means carried on said circuit board, a first frame for holding said contact members in such a manner that the contact portions and solder lug portions thereof project from said first frame, said contact portions in each case including spring prongs.

17. Composite connector as defined in claim 16, wherein said second circuit board is substantially rectangular and the length of its sides, the length of the corresponding sides of said first frame of said second unit and the length of the corresponding sides of said base plate of said first unit are substantially the same.

18. Composite connector as defined in claim 17, wherein spring clasps (39) are provided for holding together said base plate (6) of said first unit and said first frame (22) of said second unit at at least two opposite sides of said base plate and of said first frame.

19. Composite connector as defined in claim 17, wherein said second contact and circuit unit also comprises a spacing frame (3) detachable from and attachable to the remainder of said second contact and circuit unit and having the same side lengths as said first frame of said second circuit unit, for being interposed between said second circuit board (21) and said electrical apparatus.

20. Composite connector as defined in claim 19, wherein resilient catches (31, 32) are provided for holding said spacing frame (3) against said surface of said electrical apparatus.

21. Composite connector as defined in claim 9, wherein resilient catches (33, 34) are provided for said spacing frame (3), each for catching in a cavity provided in said first frame of said second contact and circuit unit.

* * * * *